United States Patent
Kuroki et al.

(10) Patent No.: US 8,411,949 B2
(45) Date of Patent: Apr. 2, 2013

(54) IMAGE RASTERIZATION PROCESSING APPARATUS USING INTERMEDIATE LANGUAGE FORM DATA, COMPUTER-READABLE RECORDING MEDIUM STORING PROGRAM AND IMAGE PROCESSING METHOD

(75) Inventors: Jun Kuroki, Superior, CO (US); Fumihito Akiyama, Yokohama (JP); Masahiro Ozawa, Hino (JP); Takahisa Matsunaga, Hino (JP); Hiroshi Nogawa, Hachioji (JP); Yasufumi Aoyama, Hino (JP); Kunikazu Satou, Tama (JP); Yasutaka Shimohara, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 105 days.

(21) Appl. No.: 13/015,631

(22) Filed: Jan. 28, 2011

(65) Prior Publication Data
US 2011/0235911 A1    Sep. 29, 2011

(30) Foreign Application Priority Data

Jan. 29, 2010    (JP) ................................. 2010-017867

(51) Int. Cl.
*G06K 9/34* (2006.01)
*G06K 9/00* (2006.01)
(52) U.S. Cl. ...................................... 382/173
(58) Field of Classification Search .................. 382/164, 382/173, 181; 358/1.13–1.16, 2.1, 524
See application file for complete search history.

(56) References Cited

U.S. PATENT DOCUMENTS

| | | | |
|---|---|---|---|
| 6,348,969 B1 * | 2/2002 | Ikeda | 358/1.15 |
| 7,450,252 B1 * | 11/2008 | Idehara | 358/1.13 |
| 2007/0091352 A1 * | 4/2007 | Nakata et al. | 358/1.14 |
| 2007/0133044 A1 * | 6/2007 | Tanaka | 358/1.15 |
| 2009/0244610 A1 | 10/2009 | Mizutani et al. | |
| 2011/0235105 A1 * | 9/2011 | Ozawa et al. | 358/1.15 |
| 2011/0235911 A1 * | 9/2011 | Kuroki et al. | 382/173 |

FOREIGN PATENT DOCUMENTS

| | | |
|---|---|---|
| CN | 101145093 A | 3/2008 |
| CN | 101551866 A | 10/2009 |
| JP | 2005-108114 A | 4/2005 |

OTHER PUBLICATIONS

Office Action from the Patent Office of the People's Republic of China dated Nov. 1, 2012, issued in corresponding Chinese Patent Application No. 201110031312.5, with English translation thereof.

* cited by examiner

*Primary Examiner* — Amir Alavi
(74) *Attorney, Agent, or Firm* — Buchanan Ingersoll & Rooney PC (57) ABSTRACT

The image processing apparatus includes: a storage section including a region to be used when rasterization processing is performed with respect to intermediate language form data created by a band based on page description language form data; a plurality of operation sections; and a control section to perform the rasterization processing with respect to the intermediate language form data by using the operation sections. The control section generates a plurality of segmented regions by dividing the band constituting each pieces of the intermediate language form data into a plurality of pieces based on the number of the operation sections, and assigns a segmented region for executing the rasterization processing among the segmented regions to each of the operation sections.

15 Claims, 10 Drawing Sheets

IMAGE RASTERIZATION PROCESSING APPARATUS USING INTERMEDIATE LANGUAGE FORM DATA, COMPUTER-READABLE RECORDING MEDIUM STORING PROGRAM AND IMAGE PROCESSING METHOD

CROSS-REFERENCE TO RELATED APPLICATION

The present U.S. patent application claims a priority under the Paris Convention of Japanese patent application No. 2010-017867 filed on Jan. 29, 2010, which shall be a basis of correction of an incorrect translation.

BACKGROUND

1. Field of the Invention

The present invention relates to an image processing apparatus, a computer-readable recording medium storing a program, and an image processing method.

2. Description of Related Art

In recent years, there has been created a multi-core processor which is configured to include a plurality of operation sections (hereinafter referred to as cores) such as processor cores being accumulated in one package, and which performs parallel processing by dispersing processing to the respective cores so as to improve its processing performance.

With regard to an image forming apparatus such as a printer, a copier, a facsimile machine, and a multifunction peripheral including these machines, it has been proposed to achieve speed-up of printing processing by executing the parallel processing with the multi-core processor.

For executing printing processing in such image forming apparatus using the multi-core processor, there has been known a technique to perform compression processing and/or expansion processing in parallel by dividing image data of one page into a plurality of bands and assigning the cores to the bands respectively.

Japanese Patent Application Laid-Open Publication No. 2005-108114 discloses a technique to perform compression/expansion processing in parallel by dividing each of at least one scanning line, which constitutes a bit-mapped image, into a plurality of partial regions, and assigning at least one of a plurality of processors to each of the partial regions.

Furthermore, there has been an idea to perform rasterization processing in parallel by converting page description language (PDL) format data into intermediate language (display list (DL)) format data being divided into a plurality of bands, and assigning each band of the DL data to each of the cores, in order to improve efficiency of bitmap data generation processing.

However, when performing the abovementioned rasterization processing, each band requires a work region having a capacity depending on the number of lines constituting the band. Thus, when assigning the bands to the cores respectively and performing rasterization processing simultaneously or in parallel, the work regions each having a capacity corresponding to the number of bands, which are processed simultaneously or in parallel, need to be ensured. Accordingly, the more the number of cores, the larger the work regions, and a problem of increase of a memory capacity to be used as the work regions arises.

SUMMARY

The present invention was made in view of the abovementioned situation, and an object thereof is to suppress enlargement of a memory usage when executing rasterization processing with a plurality of operation sections.

To achieve at least one of the abovementioned objects, according to one aspect of the present invention, there is provided an image processing apparatus including: a storage section including a region to be used when rasterization processing is performed with respect to intermediate language form data created by a band based on page description language form data; a plurality of operation sections; and a control section to perform the rasterization processing with respect to the intermediate language form data by using the operation sections, wherein the control section generates a plurality of segmented regions by dividing the band constituting each pieces of the intermediate language form data into a plurality of pieces based on the number of the operation sections, and assigns a segmented region for executing the rasterization processing among the segmented regions to each of the operation sections.

Preferably, in the image processing apparatus, the control section obtains the number of the operation sections which can execute the rasterization processing among the operations sections, and divides the band into the pieces depending on the obtained number of the operation sections to generate the segmented regions.

Preferably, in the image processing apparatus, the band is composed of a plurality of lines of which the number is previously set, and the control section determines the number of lines constituting each of the segmented regions based on a value obtained by dividing the number of lines constituting the band by the number of the operation sections.

Preferably, the control section sets, for each band, one of the segmented regions constituting the band for each of the operation sections, and assigns the set segmented region as the segmented region for executing the rasterization processing to each of the operations sections.

Preferably, the control section sets a priority level to each of the segmented regions constituting the intermediate language form data of one page, and assigns a segmented region which has not been subjected to the rasterizing processing and has highest priority level among the segmented regions to each of the operation sections as the segmented region for executing the rasterization processing.

BRIEF DESCRIPTION OF THE DRAWINGS

The present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

In the following, an embodiment of the present invention is described with reference to the attached drawings.

First, the configuration thereof is described.

Figure 1:
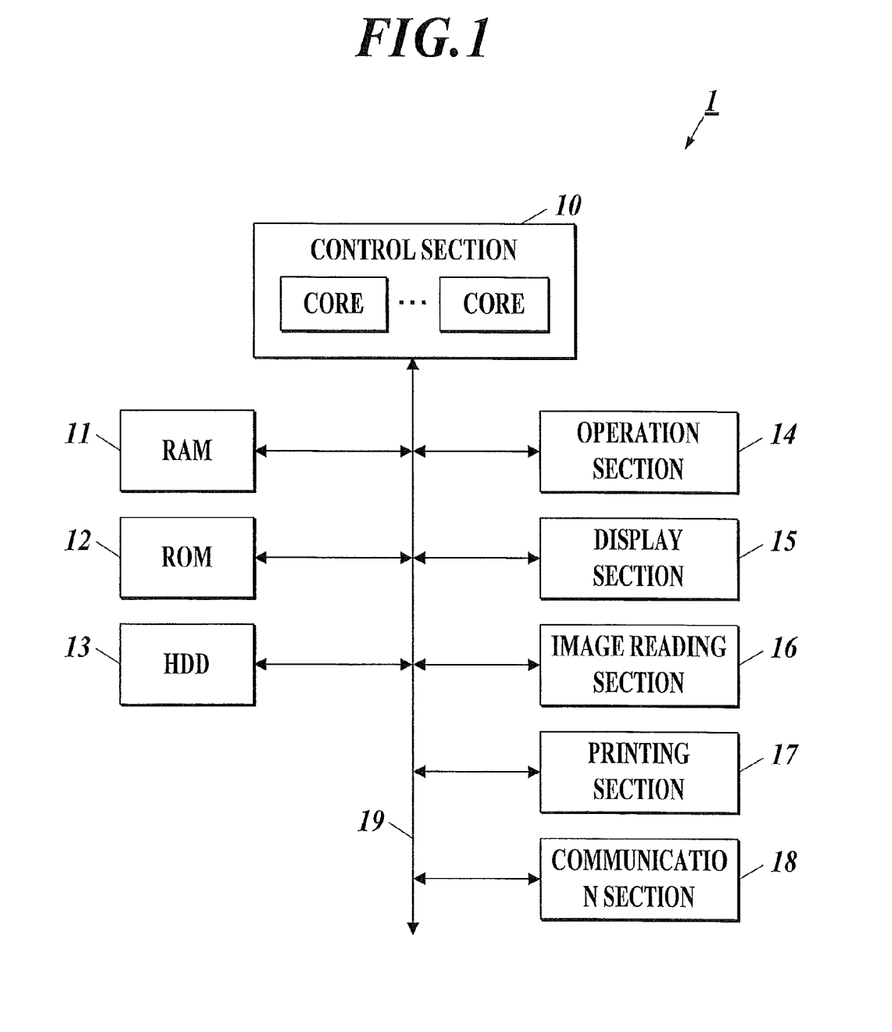
FIG. 1 is a control block diagram of an image processing apparatus.

FIG. 1 shows a control block diagram of an image processing apparatus 1 of the present embodiment.

As shown in FIG. 1, the image processing apparatus 1 is equipped with a control section 10, a random access memory (RAM) 11, a read only memory (ROM) 12, a hard disk drive (HDD) 13, an operation section 14, a display section 15, an image reading section 16, a printing section 17, a communication section 18, and the like, the respective sections are connected to each other through a bus 19 or the like.

The image processing apparatus 1 according to the embodiment also has functions as an image forming apparatus including a copying function to read an image from an original document (hereinafter referred to as a document) as an object of reading to form the read image on a recording medium (hereinafter referred to as a sheet) such as flat paper as an object of processing, a printing function to receive job data from an external apparatus 1 such as a personal computer to form an image on the sheet based on the received job data to output the sheet, and the like.

The control section 10 is configured to include a multi-core processor composed of a plurality of operation sections (hereinafter referred to as cores) such as processor cores. The control section 10 may be configured by assembling CPUs in place of the cores to make the CPUs exert a function equal to that of the multi-core processor.

The control section 10 expands various processing programs and data, which are stored in the ROM 12, in the RAM 11 or the HDD 13, and performs the integrated control of the respective sections of the image processing apparatus 1 on the basis of the programs. For example, the control section 10 switches among the copying mode, the printing mode, and the scanner mode, according to instruction signals input from the external apparatus connected to the operation section 14 or the communication section 18, and reads the processing programs corresponding to the respective modes to perform the control of copying, printing, the reading of image data, and the like.

Moreover, the control section 10 generates/stores a plurality of pieces of data having different formats, on the basis of image data (hereinafter referred to as PDL data) of page description language formats such as PostScript (registered trademark) and Printer Control Language (PCL), and image data of the description language formats such as Portable Document Format (PDF) and Extensible Markup Language (XML) Paper Specification (XPL), (PDL data and image data of PDF, XPL, and the like is hereafter generically referred to as page description language data), in cooperation with the RAM 11, the ROM 12 or the HDD 13.

Concretely, the control section 10 first interprets the page description language data to generate intermediate language format data (hereinafter referred to intermediate data) between the page description language data and the bitmap format data (hereinafter referred to as bitmap data) by a band, and stores the generated intermediate data in the RAM 11. The control section 10 further generates the bitmap data on the basis of the intermediate data to store the generated bitmap data in the RAM 11.

The intermediate data is the data generated depending on a feature of an object (text data, graphic data, image data, or the like) contained in the page description language data. For example, vector format data may be adopted as the intermediate data of text data or graphic data, and image format data may be adopted as the intermediate data of image data.

The RAM 11 temporarily stores the data and the like processed by various programs, such as the data and the like pertaining to image formation. In place of the RAM 11, for example, readable/writable volatile or nonvolatile storage media such as a hard disk drive (HDD), a magnetic random access memory (MRAM) and flash memory may be used.

The RAM 11 of the embodiment further functions as a storage section having a work region containing a plurality of rasterization regions to be used when performing rasterization processing to the intermediate data generated by the band to generate the bitmap data.

In addition, the RAM 11 may be the one fixedly provided on a control substrate or the like, or the one mounted thereon detachably/attachably.

The ROM 12 stores various processing programs pertaining to image formation, data and the like pertaining to image formation, and data and the like processed by various programs. The ROM 12 also stores programs and data for actualizing the respective processing of the embodiment in cooperation with the control section 10 and the RAM 11. In place of the ROM 12, for example, readable nonvolatile storage media such as a magnetic/optical storage medium and a semiconductor memory may be used. Moreover, the ROM 12 may be the one fixedly provided on the control substrate or the like, or the one mounted thereon detachably/attachably.

For example, the ROM 12 stores programs and data for actualizing a function to receive job data input through the communication section 18 to store the input job data in the RAM 11. The ROM 12 further stores programs and data for actualizing a function to read job data stored in the RAM 11 to generate the intermediate data having the format between the read electronic job data and the bitmap data by the band to store the generated intermediate data in the RAM 11.

Moreover, the ROM 12 also previously stores information of the number of all cores mounted in the control section 10 and the number of lines (the number of band lines) of the intermediate data generated by the band.

The ROM 12 further stores programs and data for executing rasterization master processing (hereinafter referred to as RAS-master) for generating a plurality of segmented regions by dividing the intermediate data of each band into plural pieces on the basis of the number of cores equipped in the control section 10, and assigning a segmented region for performing the rasterization processing among the segmented regions to each of the cores.

The ROM 12 further stores programs and data for executing rasterization slave processing (hereinafter referred to as RAS-slave) for generating bitmap data on the basis of the assigned intermediate data to store the generated bitmap data.

Furthermore, the ROM 12 stores programs and data for actualizing a function to output the generated bitmap data of one page to the printing section 17 to form an image on the sheet, and to erase (release) the output bitmap data from the RAM 11.

Although an output destination of bitmap data is described as the printing section 17 in the embodiment, the output destination is not limited thereto. For example, the output destination may be set to the display section 15, and the image based on the bitmap data may be displayed on the display section 15.

The HDD 13 stores operation programs, various application programs, and various pieces of data such as job data, being correlated with predetermined addresses respectively.

In addition, a compact flash (CF) or the like may be used in place of the HDD 13 as long as it is a readable/writable nonvolatile storage medium.

The operation section 14 is composed of an infrared ray type or an electrostatic type touch panel and a hard key. The touch panel is provided to be superposed on the display section 15 composed of a liquid crystal display (LCD) or the like. The display section 15 displays various operation screens and various operation guides of the image processing apparatus 1.

The image reading section 16 is composed of an automatic document conveying section and a reading section.

The automatic document conveying section is one called auto document feeder (ADF), and conveys the documents loaded on a document tray to a reading position of the reading section one by one.

The reading section is configured to include a scanner equipped with a light source, a lens, a contact glass, an image sensor, and the like. The reading section reads an image on the document by forming an image of light with which the document is irradiated and which is reflected thereon and performing photoelectric conversion of the image, and outputs the read original image to the printing section 17. The image is intended not to be limited to the ones based on image data such as a figure and a photograph, but is intended to include the ones based on text data such as a letter and mark.

The printing section 17 is composed of a known image formation mechanism for performing various kinds of image formation by an electronic photograph process and the like, and forms the images based on pieces of bitmap data of the respective colors (such as, yellow (Y), magenta (M), cyan (C), and black (K)) on a sheet or the like to output the sheet.

The communication section 18 connects the image processing apparatus 1 to an external communication line to enable the image processing apparatus 1 to communicate with the external apparatus. The communication section 18 is a network interface card (NIC) for example, and a device which enables a connection depending on the type of the communication line can be used.

Next, an operation of the embodiment is described.

Figure 2:
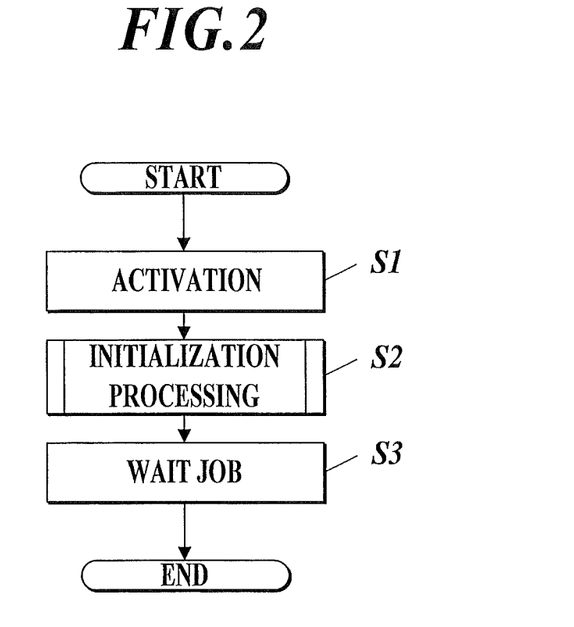
FIG. 2 is a flowchart of activation processing.

FIG. 2 shows a flowchart of activation processing of the embodiment.

The activation processing shown in FIG. 2 is executed by one of the cores, which constitute the control section 10, in cooperation with the respective sections of the image processing apparatus.

First, when electric power is supplied to the image processing apparatus 1, the respective sections of the image processing apparatus 1 are activated (Step S1), and initialization processing is executed (Step S2). After the initialization processing, the image processing apparatus 1 shifts to a waiting state for reception of the job data (Step S3), and the activation processing ends.

Figure 3:
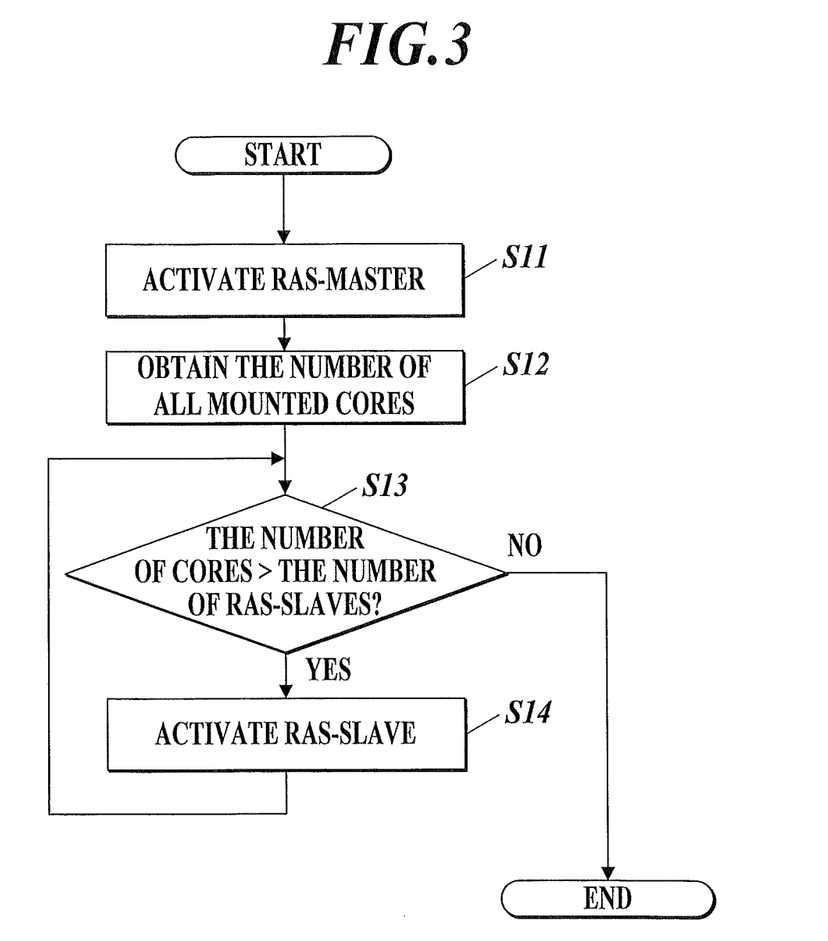
FIG. 3 is a flowchart of initialization processing.

FIG. 3 shows a flowchart of the initialization processing executed in Step S2.

The program for executing the RAS-master is expanded in the RAM 11, and the RAS-master is activated (Step S11). The activated RAS-master is in a waiting state until start timing of processing. In addition, information of the number of all cores mounted in the control section 10 is obtained from the ROM 12 (Step S12).

It is judged whether or not the number of cores obtained in Step S12 is larger than the number of RAS-slaves which are expanded in the RAM 11 and are activated (Step S13).

When the number of cores is larger than the number of RAS-slaves (Step S13: YES), the program for executing the RAS-slaves is expanded in the RAM 11, and one of the RAS-slaves is activated (Step S14). Then the processing advances to that of Step S13. The activated RAS-slave becomes a waiting state until start timing of processing.

When the number of cores is equal to or less than the number of RAS-slaves (Step S13: NO), the initialization processing ends.

Thus, in the initialization processing executed in Step S2, a task of executing the RAS-slaves the number of which corresponds to the number of cores included in the control section 10 is provided, and the task becomes an execution waiting state. For example, when the control section 10 is equipped with four cores, four tasks of executing the RAS-slaves respectively are provided.

Figure 4:
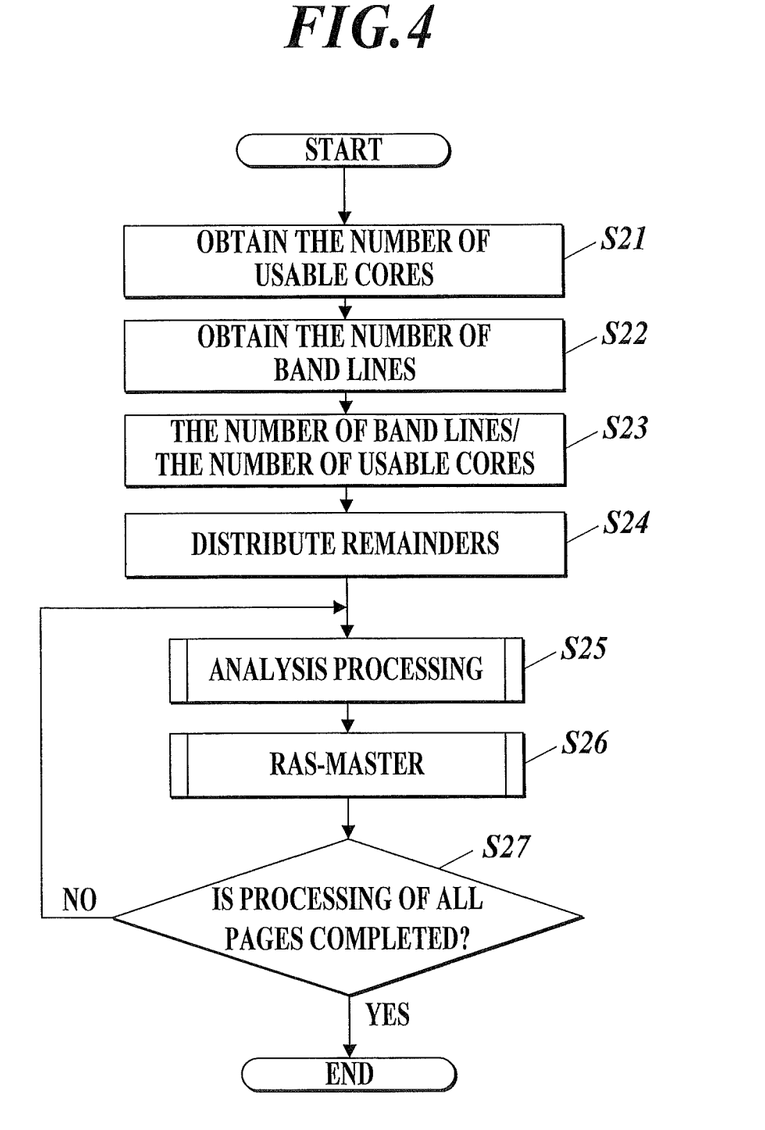
FIG. 4 is a flowchart of bitmap data generating processing on the basis of received job data.

FIG. 4 shows a flowchart of bitmap data generating processing on the basis of the received job data. The processing shown in FIG. 4 is executed by one of the cores, which constitute the control section 10, in cooperation with the respective sections in the image processing apparatus 1.

First, the number of cores usable for executing the rasterization processing among the cores mounted on the control section 10 is obtained (Step S21).

In Step S21, the number of usable cores is obtained based on the task of managing operation situations of the respective cores which constitute the control section 10, obtained by referring a table which is provided in a previously set region in the RAM and in which data indicating usage situations of the respective cores constituting the control section 10 is stored/updated, or obtained by other means.

Moreover, the number of lines (the number of band lines) constituting one band is obtained from the ROM 12 (Step S22).

The band is composed of a plurality of lines. The number of band lines is individually set to each image processing apparatus in advance, and is previously stored in the ROM 12. Each of the lines is a set of pixels constituting an image and being arranged in a predetermined one direction (e.g. the main scanning direction of the image). The image is configured by arranging and combining the lines in the other direction (e.g. the sub-scanning direction of the image) perpendicular to the predetermined one direction.

When the number of usable cores and the number of band lines are obtained, the number of lines constituting each segmented region generated by dividing the band into a plurality of pieces depending on the number of usable cores is determined (Step S23 and S24).

First, in Step S23, the number of band lines is divided by the number of usable cores, and a divided value is calculated. The divided value calculated in Step S23 contains a quotient of an integer and a surplus (remainder).

Then, in Step S24, a provisional number of lines constituting each segmented region is set to the value of the quotient. At this time, if a remainder exists, the number of lines indicated by the remainder is uniformly distributed to any segmented regions.

For example, if the number of band lines is 256 and the number of usable cores is 3, the divided value calculated in Step S23 is composed of a quotient of 85 and a remainder of 1. In this case, because one band is divided into three segmented regions corresponding to the number of usable cores, the one line as the reminder is distributed to one of the three segmented regions. Consequently, the segmented regions are composed of two segmented regions each including 85 lines, and one segmented region including 86 lines.

When the number of lines of each segmented region constituting the band is determined, analysis processing is executed (Step S25), and the intermediate data of one page is generated by the band. When the intermediate data of one page is generated, the processing by the RAS-master, which has been in the waiting state, is started (Step S26), and the cores to execute the RAS-slaves for rasterizing the intermediate data of the segmented regions are assigned respectively. When the respective usable cores rasterize the intermediate data of the assigned segmented regions in the rasterization regions, the bitmap data of one page is created.

After the bitmap data of one page is created, it is judged whether or not generation of the bitmap data of all pages constituting the job data is completed (Step S27).

When the generation of the bitmap data of all pages is not completed yet (Step S27: NO), the processing returns to Step S25. When the generation of the bitmap data of all pages is completed (Step S27: YES), the series of the processing of generating the bitmap data based on the received job data ends.

Figure 5:
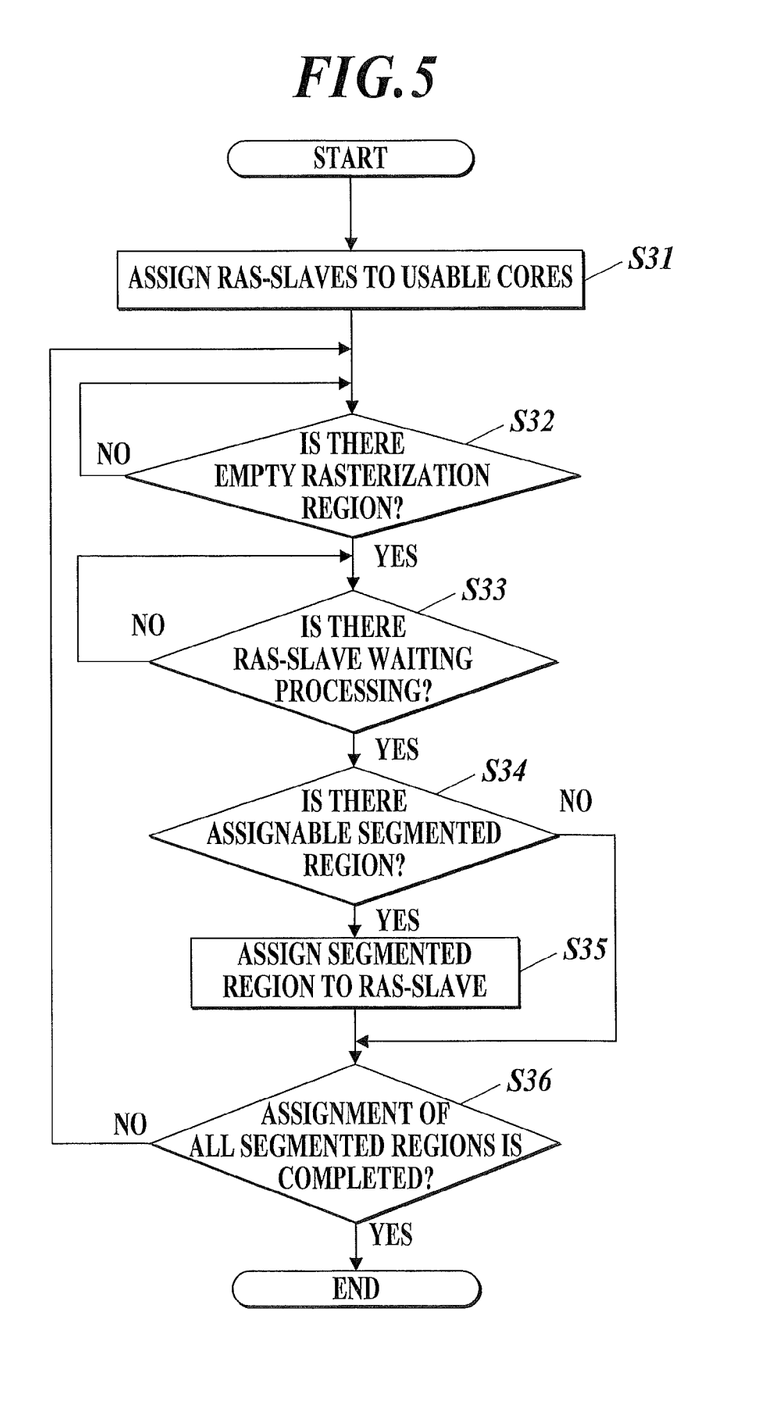
FIG. 5 is a flowchart of a RAS-master.

FIG. 5 shows a flowchart of the RAS-master executed in Step S26.

First, one of the RAS-slaves activated by the initialization processing is assigned to each of the usable cores (Step S31). In addition, each band is divided into the segmented regions depending on the number of lines determined in Steps S23 and S24.

In Step S31, for example, when the number of RAS-slaves activated in the initialization processing is four (first to fourth RAS-slaves) and the number of usable cores is three (first to third cores), the first RAS-slave is assigned to the first core, the second RAS-slave is assigned to the second core, and the third RAS-slave is assigned to the third core.

Next, it is judged whether or not there is an empty rasterization region in the RAM 11 (Step S32).

The rasterization region is used when the intermediate data is expanded into bitmap data. When the bitmap data of one band is generated, the bitmap data is compressed and stored in another region in the RAM 11 (band transfer). In Step S31, a region is accordingly judged as an empty rasterization region, which region is neither the region in which the bitmap data is generated from the intermediate data nor the region in which the band transfer is performed. The judgment processing in Step S32 may periodically be performed or may be performed when the band transfer is completed.

When there is no empty rasterization region (Step S32: NO), the processing returns to Step S32. When there is an empty rasterization region (Step S32: YES), it is judged whether or not there are any RAS-slaves waiting the start of processing, namely, which core has the RAS-slave being in the waiting state (Step S33). The judgment processing in Step S33 may be executed periodically or may be performed when any of cores ends the RAS-slave.

When there is no RAS-slave in the waiting state, namely, when all the usable cores are executing RAS-slaves or performing band transfer (Step S33: NO), the processing returns to Step S33. When there is the RAS-slave in the waiting state (Step S33: YES), it is judged whether or not there is an assignable segmented region to be executed by the RAS-slave in the waiting state (Step S34).

If there is an assignable segmented region (Step S34: YES), the assignable segmented region is assigned to the core executing the RAS-slave in the waiting state (Step S35).

If there is no assignable segmented region (Step S34: NO), or after Step S35, it is judged whether or not all the respective segmented regions of each band constituting the intermediate data of one page are assigned to any one of the cores executing RAS-slaves (Step S36).

When all the respective segmented regions of each band constituting the intermediate data of one page are not assigned to any one of the plurality of cores executing the RAS-slaves (Step S36: NO), the processing returns to Step S32. When all the segmented regions of each band constituting the intermediate data of one page are assigned to one of the plurality of cores executing the RAS-slaves (Step S36: YES), the RAS-master ends.

Next, the assignment of the segmented regions in the RAS-master is described with reference to FIGS. 6-8.

Figure 6:
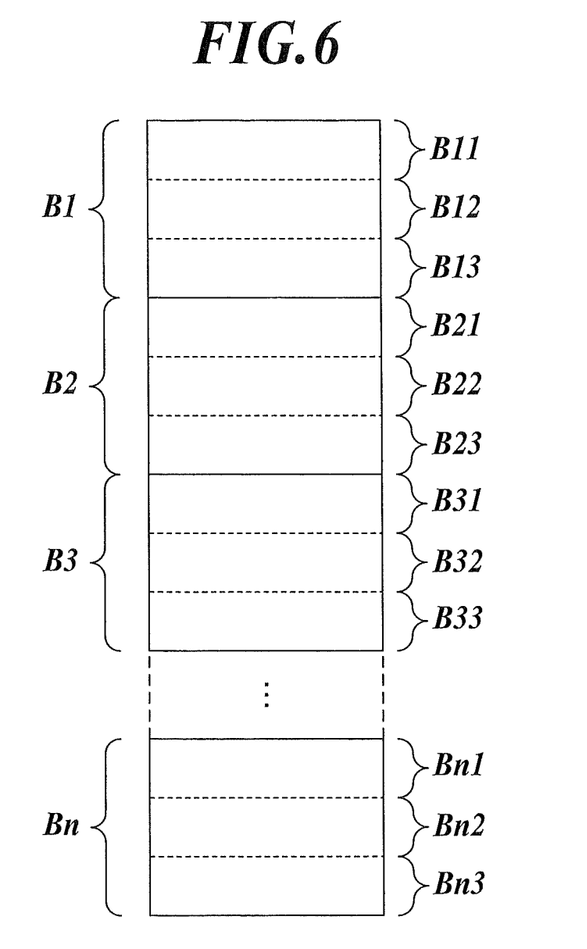
FIG. 6 is an image view where each band constituting intermediate data of one page is divided into a plurality of segmented regions.

FIG. 6 shows an image view where each band constituting intermediate data of one page is divided into a plurality of segmented regions. FIG. 6 is an image view in the case where the number of usable cores is three and one band is divided into three segmented regions.

As shown in FIG. 6, the intermediate data of one page is composed of a first band B1 to an $n^{th}$ band Bn. The first band B1 is divided into three segmented regions of a first segmented region B11, a second segmented region B12, and a third segmented region B13. Similarly to the first band B1, the second band B2 to the nth band Bn are each divided into three segmented regions.

Figure 7:
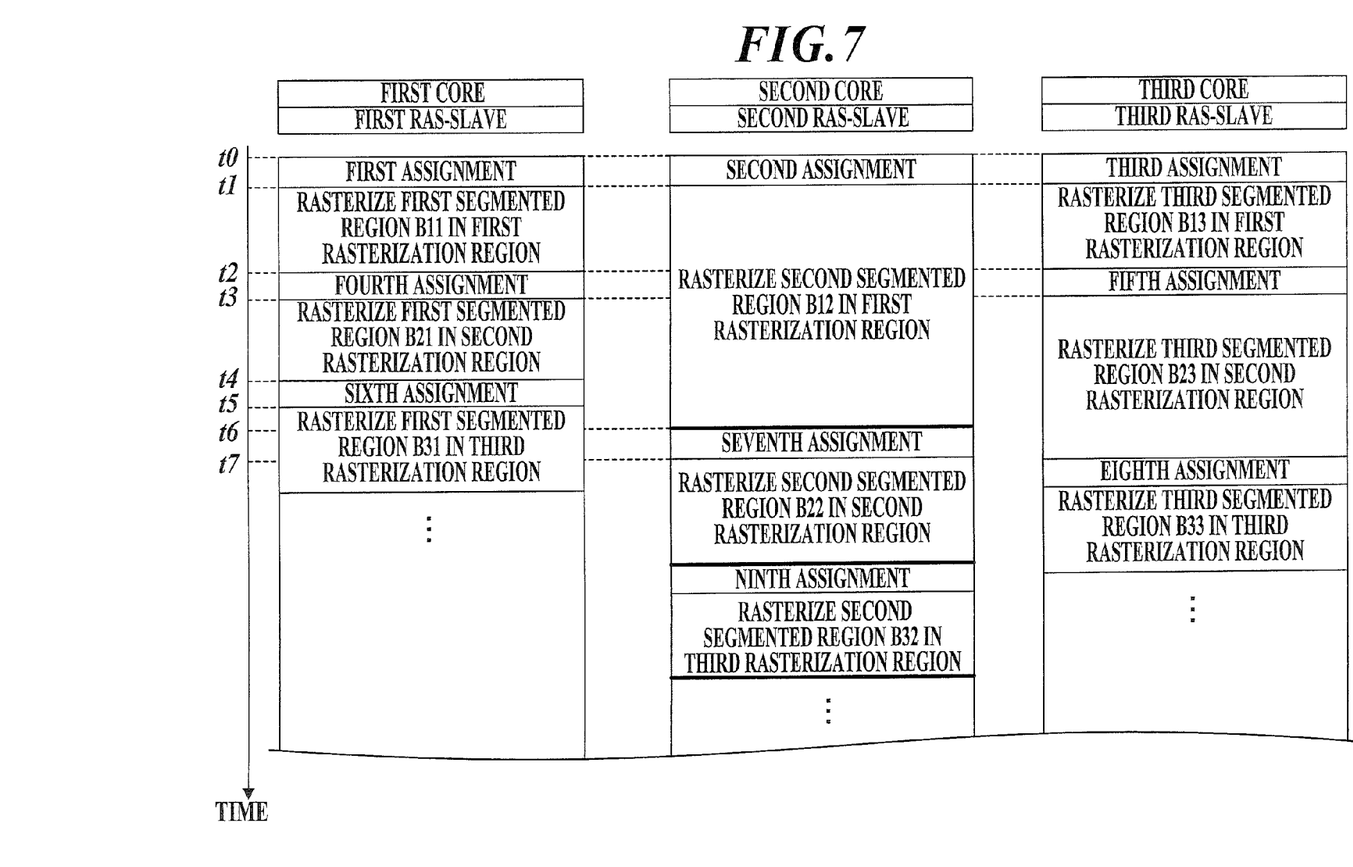
FIG. 7 is an image view of a fixed distribution processing.
Figure 8:
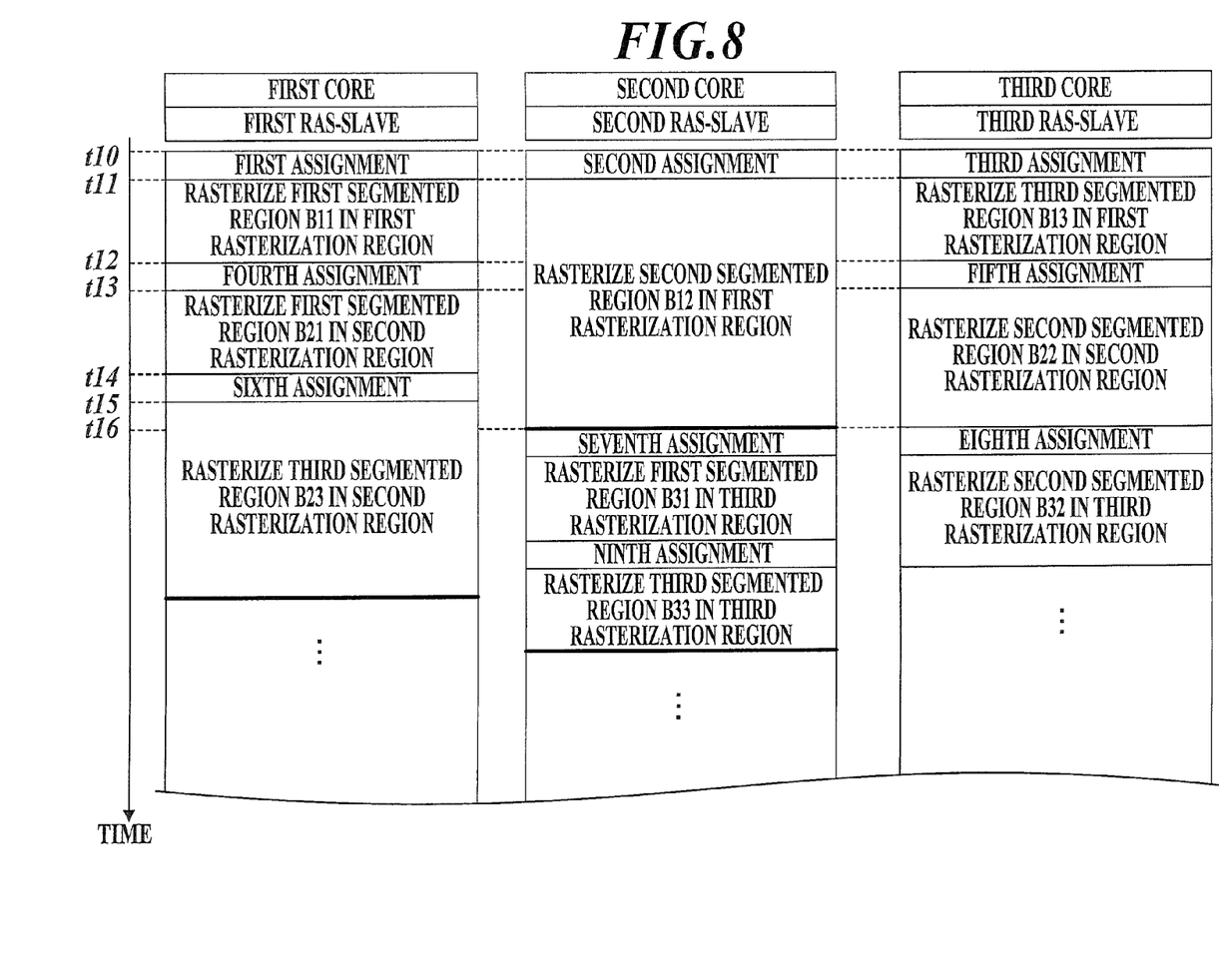
FIG. 8 is an image view sequential distribution processing.

FIGS. 7 and 8 show image views of assignment processing of the segmented regions in the RAS-master, in the example of band division in FIG. 6. In addition, the assignment processing of the segmented regions in the RAS-master is set to one of the processings of FIGS. 7 and 8 in advance.

In FIGS. 7 and 8, a first RAS-slave, a second RAS-slave, and a third RAS-slave are assigned to a first core, a second core, and a third core respectively, as the RAS-slaves executed in the usable three cores (first to third cores), in Step S31.

In addition, the RAM 11 includes three rasterization regions (first-third rasterization regions) usable by the band as rasterization regions.

In the assignment processing of the segmented regions in the RAS-master shown in FIG. 7, the rasterization processing of one band is distributed to the respective usable cores to be executed therein. The assignment processing of the segmented regions in the RAS-master as shown in FIG. 7 is called fixed distribution processing.

In the fixed distribution processing shown in FIG. 7, first, when the RAS-slaves are assigned to the usable cores respectively in Step S31 of FIG. 5, any one of the three segmented regions constituting each band is set with respect to each of the cores executing the RAS-slave.

For example, the first segmented region of the three segmented regions constituting each band is set to the first core executing the first RAS-slave. The second segmented region is set to the second core executing the second RAS-slave, and the third segmented region is set to the third core executing the third RAS-slave.

After the processing in Step S31, as shown in FIG. 7, at a time t0, all the rasterization regions are available and the RAS-slaves to be executed by all the cores are in their waiting states. Consequently, the first segmented region B11 in the first band B1 is assigned to the first RAS-slave executed by the first core; the second segmented region B12 in the first band B1 is assigned to the second RAS-slave executed by the second core; third segmented region B13 in the first band B1 is assigned to the third RAS-slave executed by the third core (first assignment to third assignment).

At a time t1, the first to third cores start the rasterization of the assigned segmented regions by using the first rasterization region.

At a time t2, when the rasterization of the first segmented region B11 of the first band B1 ends in the first core, the first RAS-slave goes into a waiting state. At that time, the second and third rasterization regions are in available states. It is judged whether or not there is an assignable segmented region with respect to the first RAS-slave in the waiting state. As the segmented region assigned to the first RAS-slave, the first segmented region of each band is set, and consequently it is judged whether or not there is the first segmented region which has not been rasterized. As the first segmented region which has not been rasterized yet, a first segmented region B21 in the second band B2 is assigned to the first RAS-slave executed by the first core (fourth assignment).

Moreover, similarly to the first core, when the rasterization of the third segmented region B13 of the first band B1 ends in the third core, the third RAS-slave goes into a waiting state. Because the third segmented region of each band is set as the segmented region assigned to the third RAS-slave, it is judged whether or not there is a third segmented region which has not been rasterized. As the third segmented region which has not been rasterized yet, a third segmented region B23 in the second band B2 is assigned to the third RAS-slave executed by the third core (fifth assignment).

At a time t3, the first and third cores start the rasterization of the assigned segmented regions by using the second rasterization region different from the first rasterization region.

At a time t4, when the rasterization of the first segmented region B21 of the second band B2 ends in the first core, the first RAS-slave goes into a waiting state. At that time, the third rasterization region is in an available state. Similarly to the case of the fourth assignment, a first segmented region B31 in the third band B3 is assigned to the first RAS-slave executed by the first core (sixth assignment).

Then, at a time t5, the first core starts the rasterization of the assigned first segmented region B31 in the third band by using the third rasterization region.

At a time t6, when the rasterization of the second segmented region B12 of the first band B1 ends in the second core, since the rasterization of all the segmented regions constituting the first band B1 ends, bitmap data of one band is generated in the first rasterization region. The generated bitmap data of one band is compressed, and then transferred to another region in the RAM 11 to be stored therein (band transfer).

After the completion of the band transfer, the first rasterization region goes into an available region, and the second RAS-slave goes into a waiting state. It is judged whether or not there is an assignable segmented region with respect to the second RAS-slave in the waiting state. As the assignable segmented region with respect to the second RAS-slave, since the second segmented regions of each band is set, it is judged whether or not there is the second segmented region which has not been rasterized yet. As the second segmented region which has not been rasterized, a second segmented region B22 of the second band B2 is assigned to the second RAS-slave executed by the second core (seventh assignment).

At a time t7, since the assigned segmented region is the segmented region in the second band, the second core starts the rasterization of the assigned segmented region in the second rasterization region where the rasterization of the second band B2 is executed.

Thereafter, the set segmented region among the three segmented regions constituting each band is sequentially set to the respective cores executing each RAS-slave, and rasterization is executed by the segmented region.

Next, in the assignment processing of the segmented regions in the RAS-master shown in FIG. 8, the rasterization processing for one page is executed by sequentially assigning the segmented regions of each band constituting the one page to the cores executing the RAS-slave in the waiting state in accordance with their priority levels. The assignment processing of the segmented regions in the RAS-master as shown in FIG. 8 is called sequential distribution processing.

In the sequential distribution processing shown in FIG. 8, first, when the RAS-slaves are assigned to the usable cores respectively in Step S31 of FIG. 5, a priority level of executing rasterization is set to each of the segmented regions constituting the intermediate data of one page.

Hereinafter, the case where the priority levels are set in order from a top address of a page, such that: the first segmented region B11 of the first band is set to the first level; the second segmented region B12 of the first band is set to the second level; the third segmented region B13 is set to the third level; and the first segmented region B21 of the second band is set to the fourth level, is described. The priority levels are not limited to these example.

After the processing in Step S31, as shown in FIG. 8, at a time t10, all the rasterization regions are available and the RAS-slaves executed by all the cores are in their waiting state. Thus, the first segmented region Bll of the first band is assigned to the first RAS-slave executed by the first core, the second segmented region B12 of the first band is assigned to the second RAS-slave executed by the second core, and the third segmented region B13 of the first band is assigned to the third RAS-slave executed by the third core (first assignment to third assignment).

At a time t11, the first to third cores start rasterizations of the assigned segmented regions by using the first rasterization region.

At a time t12, when rasterization of the first segmented region B11 of the first band ends in the first core, the first RAS-slave goes into a waiting state. At that time, the second and third rasterization regions are available. It is judged whether or not there are any assignable segmented regions with respect to the first RAS-slave in the waiting state. The segmented region which has the highest priority level among the unrasterized segmented regions becomes the segmented region assignable to the first RAS-slave. As the segmented region which has the highest priority level among the unrasterized segmented regions, the first segmented region B21 of the second band is assigned to the first RAS-slave executed by the first core (fourth assignment).

Also in the third core, similarly to the first core, when rasterization of the third segmented region of the first band ends, the third RAS-slave goes into a waiting state. The second segmented region B22 of the second band which has the highest priority level among the unrasterized segmented regions becomes the segmented region assigned to the third RAS-slave, and the second segmented region B22 of the second band is assigned to the third RAS-slave executed by the third core (fifth assignment).

At a time t13, the first and third cores start rasterization of the assigned segmented regions by using the second rasterization region which is different from the first rasterization region.

At a time t14, when rasterization of the first segmented region B21 of the second band ends in the first core, the first RAS-slave goes into a waiting state. At that time, the third rasterization region is available. Similarly to the case of the fourth assignment, the third segmented region B23 of the second band, namely the regimented region which has the highest priority level among the unrasterized segmented regions is assigned to the first RAS-slave executed by the first core (sixth assignment).

Then, at a time t15, since the segmented region of the second band is assigned to the first core, the first core starts rasterization of the assigned third segmented region of the second band in the second rasterization region where rasterization is performed for the second band.

At a time t16, when rasterization of the second segmented region B12 of the first band ends in the second core, since rasterization of all the segmented regions constituting the first band is completed, the bitmap data of one band is created in the first rasterization region. The created bitmap data of one band is compressed, transferred to another region in the RAM and stored therein (band transfer).

When the band transfer is completed, the first rasterization region goes into an available region, and the second RAS-slave goes into a waiting state. The first segmented region B31 of the third band, namely the segmented region which has the highest priority level among the unrasterized segmented regions, becomes the segmented region assigned to the second RAS-slave in the waiting state. Thus, the first segmented region B31 of the third band is assigned to the second RAS-slave executed by the second core (seventh assignment).

Thereinafter, the segmented regions are sequentially set to the cores executing the RAS-slaves respectively depending on the priority levels, and rasterization is executed by the segmented region.

The time necessary for rasterization of one segmented region varies depending on a kind of and/or an amount of object included in each of the segmented regions constituting each of the bands. For this reason, in examples shown in FIGS. 7 and 8, the time required for starting the band transfer of the first band in the fixed distribution processing is same as that in the sequential distribution processing, but the time required for starting the band transfer of the second band in the fixed distribution processing is shorter than that in the sequential distribution processing, and the time required for starting the band transfer of the third band in the sequential distribution processing is shorter than that in the fixed distribution processing.

Next, the advantage in the case where the embodiment is applied is described.

When using a plurality of cores to perform rasterization in parallel, rasterization has been conventionally executed by the band. In such conventional technology, when rasterizing page description language form data such XPS and PDF, the required work region increases in RAM in proportion to the number of layers.

Figure 9:
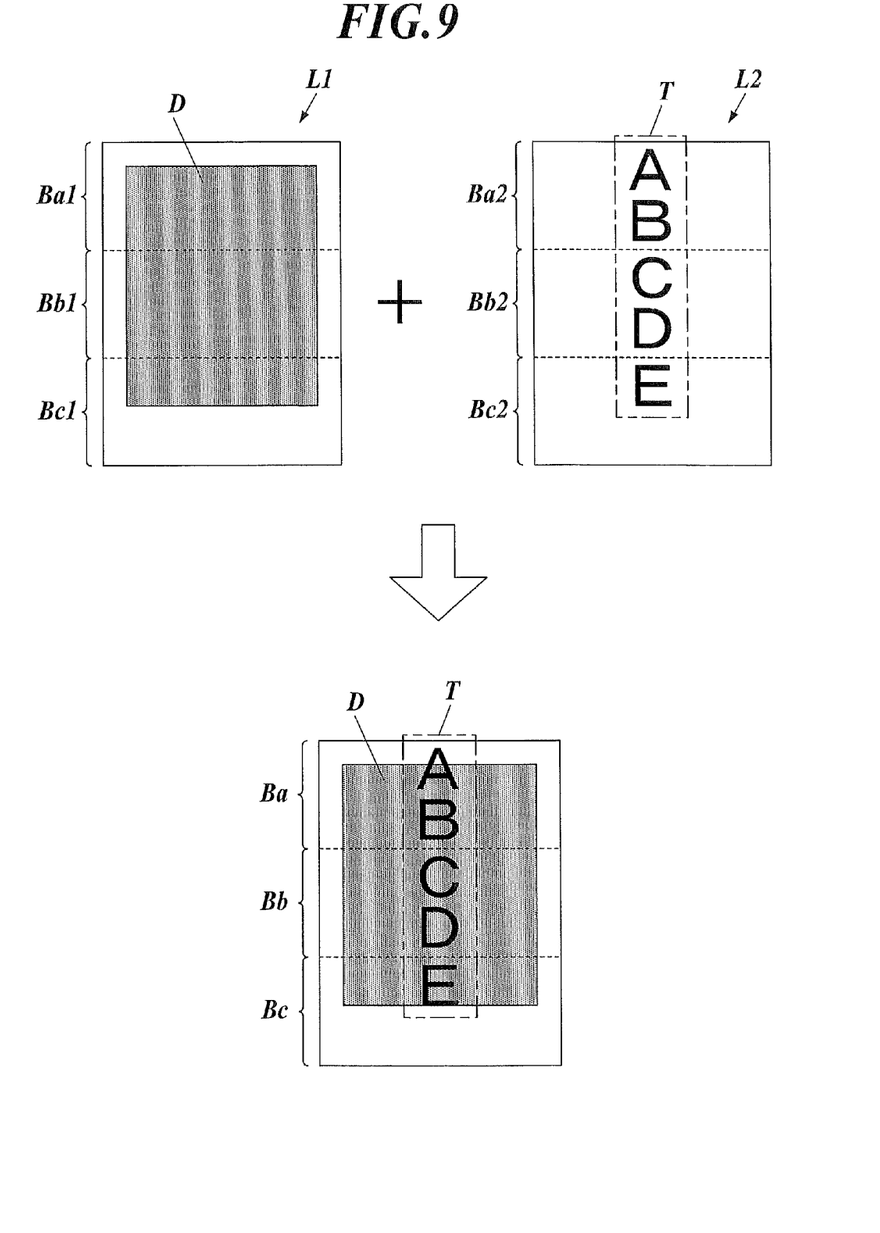
FIG. 9 is an image view of transmission processing of page description language format data having a transmission processing function.

FIG. 9 shows an image view of transmission processing of page description language format data having a transmission processing function.

FIG. 9 shows an example of a page including a layer L1 to which color graphics data D of rectangular shape belongs, and a layer L2 to which color text data T including characters of "A, B, C, D, and E" belongs. FIG. 9 shows an example where an image in which the text data T is superimposed on the graphics data D of rectangular shape as background at transmission rate of 40% is formed.

When executing rasterizing processing with respect to the page shown in FIG. 9, the work region for rasterizing the layer L1, to which the graphic object data of rectangular shape belongs, by the band, and the work region for rasterizing the layer L2, to which the text object data belongs, by the band, are required.

For example, in the case where each band shown in FIG. 9 is composed of band lines of 256 and the band width of 1024, the size of the required work region for rasterizing one band of color (CMYK) is, when 8 [bits] are required for one pixel, 1 [MByte] (=256×1024×8×4 (CMYK)=8388608 [bits]=1 [MByte]).

Moreover, in the case where one band Ba is composed of bands Ba1, Ba2 of two layers, the work region of 2 [MByte] (=1 [MByte]×2) is required for creating the bitmap data of one band.

Furthermore, in the case where the cores perform rasterization processing with respect to the bands respectively in parallel, such that: the first core executes rasterization of band Ba; the second core executes rasterization of band Bb; and the third core executes rasterization of band Bc, the work region of 6 [MByte] (=2 [MByte]×3) is required.

Thus, as the case of FIG. 9 adopting the conventional technique, in the case of using three cores to perform rasterization in parallel by the band for example, the work region of 6 [MByte] or more always needs to be ensured in the RAM 11.

On the other hand, the embodiment divides one band into the segmented regions depending on the number of usable cores, and performs rasterization of the segmented regions with the cores respectively in parallel.

Figure 10:
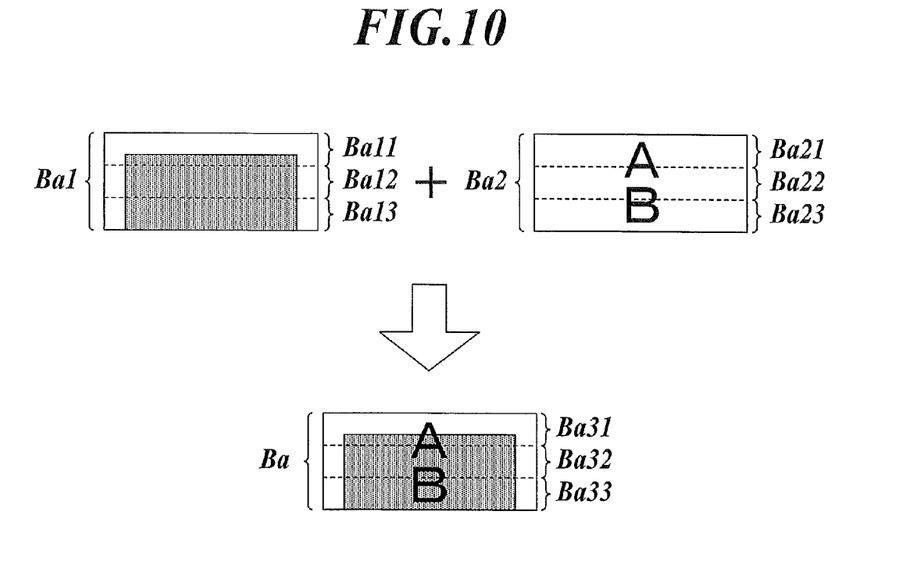
FIG. 10 is an image view of transmission processing of data of one band.

FIG. 10 is an image view of transmission processing of data of one band. As shown in FIG. 10, the embodiment performs rasterization with the respective usable cores for the plurality (for example, three) of the segmented regions which are obtained by dividing band by the number (for example, three) of the usable cores.

For example, in the case where one band shown in FIG. 10 is composed of band lines of 256 and band width of 1024, and where the number of lines is divided into three segmented regions of 85, 85, and 86, the size of the required work region for rasterizing one segmented region (the number of lines is 85) of color (CMYK) becomes, when 8 [bits] are required for one pixel, about 0.33 [MByte] (=85×1024×8×4 (CMYK) =2785280 [bits]≈0.33 [MByte]).

Moreover, in the case where one segmented region Ba31 is composed of two layers Ba11, Ba21, the work region of about 0.67 [MByte] (=0.33 [MByte]×2) is required for creating the bitmap data of one segmented region.

Furthermore, in the case where the cores perform rasterization with respect to the segmented regions respectively in parallel, such that: the first core executes rasterization of the segmented region Ba31; the second core executes rasterization of the segmented region Ba32; and the third core executes rasterization of the segmented region Ba33, the work region of about 2 [MByte] (=0.067 [MByte]×3) is required.

Thus, as shown in FIG. 10, when performing rasterizing using three cores by the segmented region in parallel for example, it is only necessary to secure the work region of about 2 [MByte] or more in the RAM 11.

Accordingly, in the case of FIG. 10 adopting the embodiment, compared with the conventional case of FIG. 9, the size of the work region that needs to be secured in the RAM 11 is reduced significantly.

As described above, according to the embodiment, it is possible to divide the band constituting each piece of the intermediate data into the plural pieces based on the number of cores constituting the control section 10 to generate the segmented regions, and to assign the segmented regions for executing rasterization to the cores respectively. Thus, the size of the intermediate data for which one core performs rasterization processing at once becomes small, and the work region in the RAM 11 to be used when one core performs rasterization processing can be downsized. As a result, memory usage at the time of executing rasterization processing by using the plurality of cores can be reduced.

Especially, since the plurality of segmented regions can be generated by dividing one band into the plural pieces depending on the number of cores which can execute rasterization processing, the segmented regions can be generated depending on operation states of the cores in the control section 10.

The number of lines constituting the segmented region, namely the size of the segmented region can be determined based on the value obtained by dividing the number of band lines by the number of usable cores.

Moreover, as the segmented region executing the rasterization processing for each of the cores, one set segmented region among the segmented regions constituting each of the bands can be assigned to the band. As a result, rasterization processing of one band can be shared by the cores and be executed so that memory usage to be used when each of the cores performs rasterization processing can be reduced and the time required for executing rasterization processing of one band can be reduced.

Furthermore, as the segmented region executing rasterization for each of the cores, the unrasiterized segmented region which has the highest priority level can be assigned. By this, rasterization processing of the segmented regions constituting the intermediate data of one page can be shared by the cores and be executed. As a result, memory usage to be used when each of the cores performs rasterization processing can be reduced and the time required for executing rasterization processing of one band can be reduced.

Although the example where the ROM 12 is used as the computer readable medium for the program of the present invention, the present invention is not limited to the example. As other computer readable media, non-volatile memory such as flash memory and portable recording medium such as CD-ROM can be applied. In addition, as a medium providing program data of the present invention via a communication line, also carrier wave can be applied to the present invention.

The present invention is not limited to the above embodiment, and can be changed without departing from the spirit of the present invention.

According to one aspect of the preferred embodiment of the present invention, there is provided an image processing apparatus including: a storage section including a region to be used when rasterization processing is performed with respect to intermediate language form data created by a band based on page description language form data; a plurality of operation sections; and a control section to perform the rasterization processing with respect to the intermediate language form data by using the operation sections, wherein the control section generates a plurality of segmented regions by dividing the band constituting each pieces of the intermediate language form data into a plurality of pieces based on the number of the operation sections, and assigns a segmented region for executing the rasterization processing among the segmented regions to each of the operation sections.

According to one aspect of the preferred embodiment of the present invention, there is provided a computer readable medium storing a program which causes a computer, which performs rasterization processing with respect to intermediate language form data created by a band based on page description language form data by using a plurality of operation sections, to function as: a control member to generate a plurality of segmented regions by dividing the band constituting each pieces of the intermediate language form data into a plurality of pieces based on the number of the operation sections, and to assign a segmented region for executing the rasterization processing among the segmented regions to each of the operation sections.

According to one aspect of the preferred embodiment of the present invention, there is provided an image processing method which performs rasterization processing with respect to intermediate language form data created by a band based on page description language form data by using a plurality of operation sections, the method comprising a step of: a controlling step including: generating a plurality of segmented regions by dividing the band constituting each pieces of the intermediate language form data into a plurality of pieces based on the number of the operation sections; and assigning a segmented region for executing the rasterization processing among the segmented regions to each of the operation sections.

In these image processing apparatus, computer readable medium storing the program, and the image processing method, it is possible to divide the band constituting the intermediate language form data into the plural pieces based on the number of operation sections constituting the control section to generate the segmented regions, and to assign the segmented regions for executing rasterization to the operation sections respectively. Thus, the size of the intermediate language form data for which one operation section performs rasterization processing at once becomes small, and the work region in the storage section to be used when one operation section performs rasterization processing can be downsized. As a result, memory usage at the time of executing rasterization processing by using the plurality of operation sections can be reduced.

Preferably, the control section obtains the number of the operation sections which can execute the rasterization processing among the operations sections, and divides the band into the pieces depending on the obtained number of the operation sections to generate the segmented regions.

By this, the plurality of segmented regions can be generated by dividing one band into the plural pieces depending on the number of operation sections which can execute rasterization processing.

Preferably, the band is composed of a plurality of lines of which the number is previously set, and the control section determines the number of lines constituting each of the segmented regions based on a value obtained by dividing the number of lines constituting the band by the number of the operation sections.

By this, the number of lines constituting the segmented region can be determined based on the value obtained by dividing the number of lines constituting the band by the number of operation sections.

Preferably, the control section sets, for each band, one of the segmented regions constituting the band for each of the operation sections, and assigns the set segmented region as the segmented region for executing the rasterization processing to each of the operations sections.

By this, as the segmented region executing the rasterization processing for each of the operation sections, one set segmented region among the segmented regions constituting each of the bands can be assigned to the band. As a result, rasterization processing of one band can be shared by the operation sections and be executed so that memory usage to be used when each of operation sections performs rasterization processing can be reduced and the time required for executing rasterization processing of one band can be reduced.

Preferably, the control section sets a priority level to each of the segmented regions constituting the intermediate language form data of one page, and assigns a segmented region which has not been subjected to the rasterizing processing and has highest priority level among the segmented regions to each of the operation sections as the segmented region for executing the rasterization processing.

By this, as the segmented region executing rasterization for each of the operation sections, the unrasiterized segmented region which has the highest priority level can be assigned. By this, rasterization processing of the segmented regions constituting the intermediate language form data of one page can be shared by the operation sections and be executed. As a result, memory usage to be used when each of the operation sections performs rasterization processing can be reduced and the time required for executing rasterization processing of one band can be reduced.

What is claimed is:

1. An image processing apparatus comprising:
 a storage section to be used when rasterization processing is performed with respect to intermediate language form data created from page description language form data;
 a processor including a number of operation sections; and
 the processor further including a control section to control the operation sections to perform the rasterization processing with respect to the intermediate language form data, wherein
 the control section generates a plurality of segmented regions by dividing each of the plurality of bands of the intermediate language form data into a plurality of pieces based on the number of the operation sections, and assigns each of the segmented regions to a respective one of the operation sections for executing the rasterization processing.

2. The image processing apparatus of claim 1, wherein the control section obtains the number of the operation sections which can execute the rasterization processing among the operations sections, and divides each of the bands into pieces depending on the obtained number of the operation sections to generate the segmented regions.

3. The image processing apparatus of claim 1, wherein
 each of the bands is composed of a plurality of lines of which the number is previously set, and
 the control section determines the number of lines constituting each of the segmented regions based on a value obtained by dividing the number of lines constituting each of the bands by the number of the operation sections.

4. The image processing apparatus of claim 1, wherein the control section sets, for each band, one of the segmented regions constituting the band for each of the operation sections, and assigns the set segmented region as the segmented region for executing the rasterization processing to each of the operations sections.

5. The image processing apparatus of claim 1, wherein the control section sets a priority level to each of the segmented regions constituting the intermediate language form data of one page, and assigns a segmented region which has not been subjected to the rasterizing processing and has highest priority level among the segmented regions to each of the operation sections as the segmented region for executing the rasterization processing.

6. A non-transitory computer readable medium storing a program which causes a computer, which performs rasterization processing with respect to intermediate language form data created from page description language form data by using a plurality of operation sections, to function as:
 a control member to generate a plurality of segmented regions by dividing each of a plurality of bands of the intermediate language form data into a plurality of pieces based on the number of the operation sections, and to assign each of the segmented regions to a respective one of the operation sections.

7. The non-transitory computer readable medium storing the program of claim 6, wherein the control member obtains the number of the operation sections which can execute the rasterization processing among the operations sections, and divides each of the bands into pieces depending on the obtained number of the operation sections to generate the segmented regions.

8. The non-transitory computer readable medium storing the program of claim 6, wherein
 each of the bands is composed of a plurality of lines of which the number is previously set, and
 the control member determines the number of lines constituting each of the segmented regions based on a value obtained by dividing the number of lines constituting each of the bands by the number of the operation sections.

9. The non-transitory computer readable medium storing the program of claim 6, wherein the control member sets, for each of the bands, one of the segmented regions constituting the band for each of the operation sections, and assigns the set segmented region as the segmented region for executing the rasterization processing to each of the operations sections.

10. The non-transitory computer readable medium storing the program of claim 6, wherein the control member sets a priority level to each of the segmented regions constituting the intermediate language form data of one page, and assigns a segmented region which has not been subjected to the rasterizing processing and has highest priority level among the segmented regions to each of the operation sections as the segmented region for executing the rasterization processing.

11. An image processing method which performs rasterization processing with respect to intermediate language form data created from page description language form data by using a plurality of operation sections, the method comprising a step of:
 a controlling step including: generating a plurality of segmented regions by dividing each of the plurality of bands of the intermediate language form data into a plurality of pieces based on the number of the operation sections; and assigning each of the segmented regions to a respective one of the operation sections.

12. The image processing method of claim 11, wherein the controlling step includes obtaining the number of the operation sections which can execute the rasterization processing among the operations sections, and dividing each of the bands into pieces depending on the obtained number of the operation sections to generate the segmented regions.

13. The image processing method of claim 11, wherein
 each of the bands is composed of a plurality of lines of which the number is previously set, and
 the controlling step including determining the number of lines constituting each of the segmented regions based on a value obtained by dividing the number of lines constituting each of the bands by the number of the operation sections.

14. The image processing method of claim 11, wherein the controlling step includes setting, for each band, one of the segmented regions constituting the band for each of the operation sections, and assigning the set segmented region as the segmented region for executing the rasterization processing to each of the operations sections.

15. The image processing method of claim 11, wherein the controlling step includes setting a priority level to each of the segmented regions constituting the intermediate language form data of one page, and assigning a segmented region which has not been subjected to the rasterizing processing and has highest priority level among the segmented regions to each of the operation sections as the segmented region for executing the rasterization processing.

* * * * *